(12) United States Patent
Adachi et al.

(10) Patent No.: US 7,228,125 B2
(45) Date of Patent: Jun. 5, 2007

(54) CONSTRUCTION MACHINE MANAGEMENT APPARATUS AND CONSTRUCTION MACHINES MANAGEMENT SYSTEM

(75) Inventors: Hiroyuki Adachi, Tsuchiura (JP); Toichi Hirata, Ushiku (JP); Genroku Sugiyama, Ryugasaki (JP); Hiroshi Onoue, Inashiki (JP); Hideo Karasawa, Tsuchiura (JP); Koichi Shibata, Niihari (JP); Hiroshi Watanabe, Ushiku (JP); Kiyoshi Ono, Adachi (JP); Osamu Tomikawa, Adachi (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 16 days.

(21) Appl. No.: 10/475,615

(22) PCT Filed: Apr. 22, 2002

(86) PCT No.: PCT/JP02/03989

§ 371 (c)(1),
(2), (4) Date: Nov. 26, 2003

(87) PCT Pub. No.: WO02/089030

PCT Pub. Date: Nov. 7, 2002

(65) Prior Publication Data

US 2004/0147250 A1 Jul. 29, 2004

(30) Foreign Application Priority Data

Apr. 25, 2001 (JP) .............................. 2001-127123
Apr. 25, 2001 (JP) .............................. 2001-127126
Apr. 25, 2001 (JP) .............................. 2001-127127

(51) Int. Cl.
*H04M 3/42* (2006.01)

(52) U.S. Cl. ...................... 455/414.2; 701/33; 701/35; 345/169

(58) Field of Classification Search .................. 701/35, 701/33; 345/169; 455/414.2
See application file for complete search history.

(56) References Cited

U.S. PATENT DOCUMENTS

2002/0016655 A1* 2/2002 Joao .............................. 701/35
2002/0044136 A1* 4/2002 Griffin et al. ................ 345/169
2002/0128985 A1* 9/2002 Greenwald ................... 705/400
2002/0156558 A1* 10/2002 Hanson et al. ................. 701/33
2005/0131596 A1* 6/2005 Cherrington et al. ......... 701/29

FOREIGN PATENT DOCUMENTS

EP    1 081 670 A2    3/2001
JP    A 7-271409    10/1995

(Continued)

*Primary Examiner*—Jean Gelin
*Assistant Examiner*—Pierre-Louis Desir
(74) *Attorney, Agent, or Firm*—Oliff & Berridge PLC

(57) ABSTRACT

Assessment information needed to calculate a used vehicle assessment value of a hydraulic excavator 10 is input to a portable telephone 20 and is then transmitted from the portable telephone 20. The transmitted assessment information is received at a manufacturer's base station 40 at a remote location. The used vehicle assessment value of the hydraulic excavator 10 is calculated based upon the received assessment information, and history information and operation information on the hydraulic excavator 10 read out from an operation information database 43 and a history database 42 in correspondence to an ID number assigned to the hydraulic excavator which is included in the assessment information.

5 Claims, 13 Drawing Sheets

FOREIGN PATENT DOCUMENTS

| | | |
|---|---|---|
| JP | A 9-298926 | 11/1997 |
| JP | A 10-140616 | 5/1998 |
| JP | A 2000-259729 | 9/2000 |
| JP | A 2000-333144 | 11/2000 |
| JP | A 2001-14395 | 1/2001 |

* cited by examiner

FIG.7

(a)
```
(ENGINE)
· LENGTH OF OPERATING TIME :  LESS THAN X000 HRS        NO POINTS DEDUCTED
                              X000 ~ ▲000 HOURS                 - 10
                              ▲000 HOURS OR MORE                - 25

· ABNORMALITY              :  NONE                       NO POINTS DEDUCTED
                              OIL AND/OR WATER LEAK              -15
                              DAMAGE SUCH AS CRACKING            -35
```

(b)
```
(FRONT MEMBER)
· ABNORMALITY    :  NONE                                 NO POINTS DEDUCTED
                    DEFORMATION AND/OR MINOR WEAR                -10
                    DEFORMATION AND/OR SERIOUS WEAR              -25
                    REPLACEMENT REQUIRED                        -100
```

(c)
```
(BASE)
· DRIVE TUMBLER  :  NO ABNORMALITY                       NO POINTS DEDUCTED
                    WEAR AT TOOTH FLANK Xmm OR LESS              -10
                    WEAR AT TOOTH FLANK OVER Xmm                 -20

· SHOE           :  NO ABNORMALITY                       NO POINTS DEDUCTED
                    WARPING, LOOSENING                           -15
                    REPLACEMENT REQUIRED                         -70
```

(d)
```
(APPEARANCE)
· OPERATOR'S CAB :  NO ABNORMALITY                       NO POINTS DEDUCTED
                    DAMAGED GLASS                                -5
                    CAB DEFORMATION                              -15
                    BREAKAGE OF INTERIOR EQUIPMENT               -4

· COVER          :  NO ABNORMALITY                       NO POINTS DEDUCTED
                    SCAR OR DAMAGE PRESENT                       -5
                    REPLACEMENT REQUIRED                         -12
```

FIG.9

(a)
```
(ADDITIONAL POINTS AWARDED)

· XATT (MANUFACTURED IN __ )    + 25
· EQUIPPED WITH OPB DEVICE      +10
· OP INSURANCE COVERAGE         +30
```

(b)
```
(POINTS DEDUCTED FOR OLD MACHINES)

· MANUFACTURED IN YEARS AA - BB   -10
· MANUFACTURED IN YEARS CC - DD   -25
· MANUFACTURED IN YEARS EE - FF   -100
```

CONSTRUCTION MACHINE MANAGEMENT APPARATUS AND CONSTRUCTION MACHINES MANAGEMENT SYSTEM

The disclosures of the following priority applications are herein incorporated by reference:

Japanese Patent Application No. 2001-127123 filed Apr. 25, 2001

Japanese Patent Application No. 2001-127126 filed Apr. 25, 2001

Japanese Patent Application No. 2001-127127 filed Apr. 25, 2001

TECHNICAL FIELD

The present invention relates to a technology whereby various types of management of construction machines are carried out with a high degree of efficiency through the use of communication terminals such as portable telephones.

BACKGROUND ART

The methods adopted in the related art to carry out various types of management for construction machines are explained below.

(1) Used Vehicle Assessment Management

When determining the assessed value of a used construction machine, the current condition of the construction machine needs to be considered in addition to the past maintenance history, the number of operating hours and the like. In the related art, the condition of a construction machine is determined by a service person who travels to the work site with a specific assessment form (checklist) for the construction machine to be assessed and fills out the form with the results of the assessment with regard to the various check items. Then, he manually calculates the assessed value with a pocket calculator or the like by incorporating the history information and the operation information mentioned above into the assessment results. However, a method that involves such manual work is not efficient.

(2) Inspection Information Management

When a construction machine such as a hydraulic excavator is inspected in the related art, a service person visits the work site with a specific inspection form (checklist), fills out the form with the results of the inspection of various check items, takes the form back to the office and enters the contents of the form into a specific database from a terminal. This method requires the service person to fill out the form and then enter the contents into the database, and is not efficient. In addition, there is a problem with this method in that if the inspector is a service person dispatched by a rental company, the inspection information is not readily available to the manufacturer.

(3) Operation Information Management

There are monitoring systems in the related art (e.g., Japanese Laid Open Patent Publication No. H 10-140616) achieved by providing a device that collects data related to the operating status of a work machine such as a construction machine or a dump truck at individual work machines and allowing the data collected at the collection device to be transmitted to a remote base station through a means for communication. While such a system achieves an advantage in that the operating status of each work machine can be accurately ascertained on the base station side, the operation data cannot be checked or overwritten on the work machine side.

DISCLOSURE OF THE INVENTION

The present invention provides a management method that makes it possible to carry out various types of management of construction machines with a high degree of efficiency through the use of communication terminals such as portable telephones.

In the method for construction machine assessment according to the present invention, information required to assess a construction machine input to a portable telephone is transmitted to a base station at a remote location; the transmitted information is received by a server at the base station; and a used vehicle assessment value with regard to the station; and a used vehicle assessment value with regard to the construction machine is calculated by the server based upon the received information, and history information and operation information on the construction machine read out from a specific database in correspondence to the received information, the history information including information indicating the history of past repairs, part replacements, oil changes, regular inspections, accidents and overhauls and information indicating whether or not any optional parts such as an attachment have been purchased, the operation information including information indicating the length of operating time, the lengths of time engaging in excavating operation, traveling operation, swinging operation and the like.

The construction machine assessment system according to the present invention comprises a portable telephone used to input and transmit assessment information that is required when assessing a construction machine; a reception device that receives the assessment information transmitted from the portable telephone; a database in which history information and operation information on the construction machine are stored in correspondence to an identifier assigned to the construction machine; and an arithmetic unit that calculates a used vehicle assessment value of the construction machine based upon the received assessment information, and the history information and the operation information on the construction machine read out from the database in correspondence to the identifier of the construction machine which is included in the assessment information, the history information including information indicating the history of past repairs, part replacements, oil changes, regular inspections, accidents and overhauls and information indicating whether or not any optional parts such as an attachment have been purchased, the operation information including information indicating the length of operating time, the lengths of time engaging in excavating operation, traveling operation, swinging operation and the like.

In the construction machine assessment system, it is desirable that the arithmetic unit start calculating the used vehicle assessment value in response to receiving the information from the portable telephone. The arithmetic unit may transmit an assessment item checklist to the portable telephone upon judging that a used vehicle assessment form transmission request has been issued from the portable telephone. The portable telephone may include a display unit at which the transmitted checklist is displayed.

In the construction machine inspection information transmission/reception method according to the present invention, specific inspection items are transmitted from a base station to a portable telephone, the specific inspection items transmitted from the base station are received at the portable telephone, the specific inspection items are displayed at a display unit of the portable telephone, the information of the inspection results with regard to the inspection items entered into the portable telephone are displayed at the display unit of the portable telephone, the inspection information having been entered is transmitted from the portable telephone, the transmitted inspection information is received at a base station at a remote location, and the received information is recorded into a database as inspection information corresponding to the construction machine.

The construction machine inspection information transmission/reception system according to the present invention comprises a base station provided at a remote location to construction machine and a portable telephone which exchanges information between the base station and the portable telephone. In this system, the base station includes an inspection item transmission device that transmits inspection items to the portable telephone upon judging that an inspection item transmission request has been issued from the portable telephone. The portable telephone includes a display unit for displaying the inspection items transmitted from the inspection item transmission device, an input unit for entering information of the inspection results with regard to the construction machine, a transmission unit for transmitting the inspection information. The base station includes a reception device that receives the inspection information transmitted from the transmission unit and a storage device that stores the inspection information received at the reception device into a database in correspondence to an identifier assigned to the construction machine which is included in the inspection information.

The portable telephone according to the present invention comprises a selection device that selects either a communication mode in which communication is executed or a data input mode in which various types of data are input from a control device of a construction machine, a data input device to which data are input from the control device of the construction machine in the data input mode and a display unit at which the data input through the data input device are displayed.

Alternatively, the portable telephone according to the present invention may comprise a selection device that selects either a communication mode in which communication is executed or a data output mode in which various types of data are output to a construction machine, and a data output device that outputs various types of data to the construction machine in the data output mode.

It is desirable that the portable telephone according to the present invention include both the data input device and the data output device.

The portable telephone-compatible construction machine according to the present invention comprises a reception device that receives various types of data from a portable telephone such as that described above, a recording unit that records operation information and the like with regard to the construction machine and an overwrite device that overwrites data inside the recording unit based upon the various types of data having been received.

In the data transmission/reception method achieved by using a portable telephone according to the present invention, various types of data are taken into the portable telephone from a control device of a construction machine, the various types of data thus taken in are transmitted to a base station from the portable telephone and the various types of data transmitted from the portable telephone are received at the base station.

In this data transmission/reception method, the data transmitted from the portable telephone and received at the base station may be processed at the base station, the processed data may be transmitted to the portable telephone that has transmitted the unprocessed data, the processed data transmitted from the base station may be received at the portable telephone and the received data may be displayed at a display unit of the portable telephone.

The computer program product for a portable telephone according to the present invention contains a program that enables a computer in the portable telephone to execute a selection procedure to select either a communication mode in which communication is executed or a data input mode in which various types of data are input from a control device of a construction machine, a data input procedure to input data from the control device of the construction machine in the data input mode and a display procedure to display the data input through the data input procedure.

The computer program product for a portable telephone according to the present invention may instead contain a program that enables the computer in the portable telephone to execute a selection procedure to select either a communication mode in which communication is executed or a data output mode in which various types of data are output to a construction machine and a data output procedure to output data to the construction machine in the data output mode.

It is desirable that the computer program for a portable telephone according to the present invention include both the data input procedure and the data output procedure. In such a case, one mode among the communication mode, the data input mode and the data output mode is selected through the selection procedure.

This computer program product may be a recording medium having the program recorded therein or a carrier wave on which the program is embodied as a data signal.

BRIEF DESCRIPTION OF THE DRAWINGS

FIGS. 7(*a*)–7(*d*) show examples of the items to be assessed by the service person and the specific numbers of points to be deducted;

FIGS. 9(*a*) and 9(*b*) show examples of the items to be assessed based upon the history information and the specific numbers of points to be deducted (added on);

BEST MODE FOR CARRYING OUT THE INVENTION

First Embodiment

The first embodiment in which the present invention is adopted in a used hydraulic excavator assessment is explained in reference to FIGS. 1–9.

Figure 1:
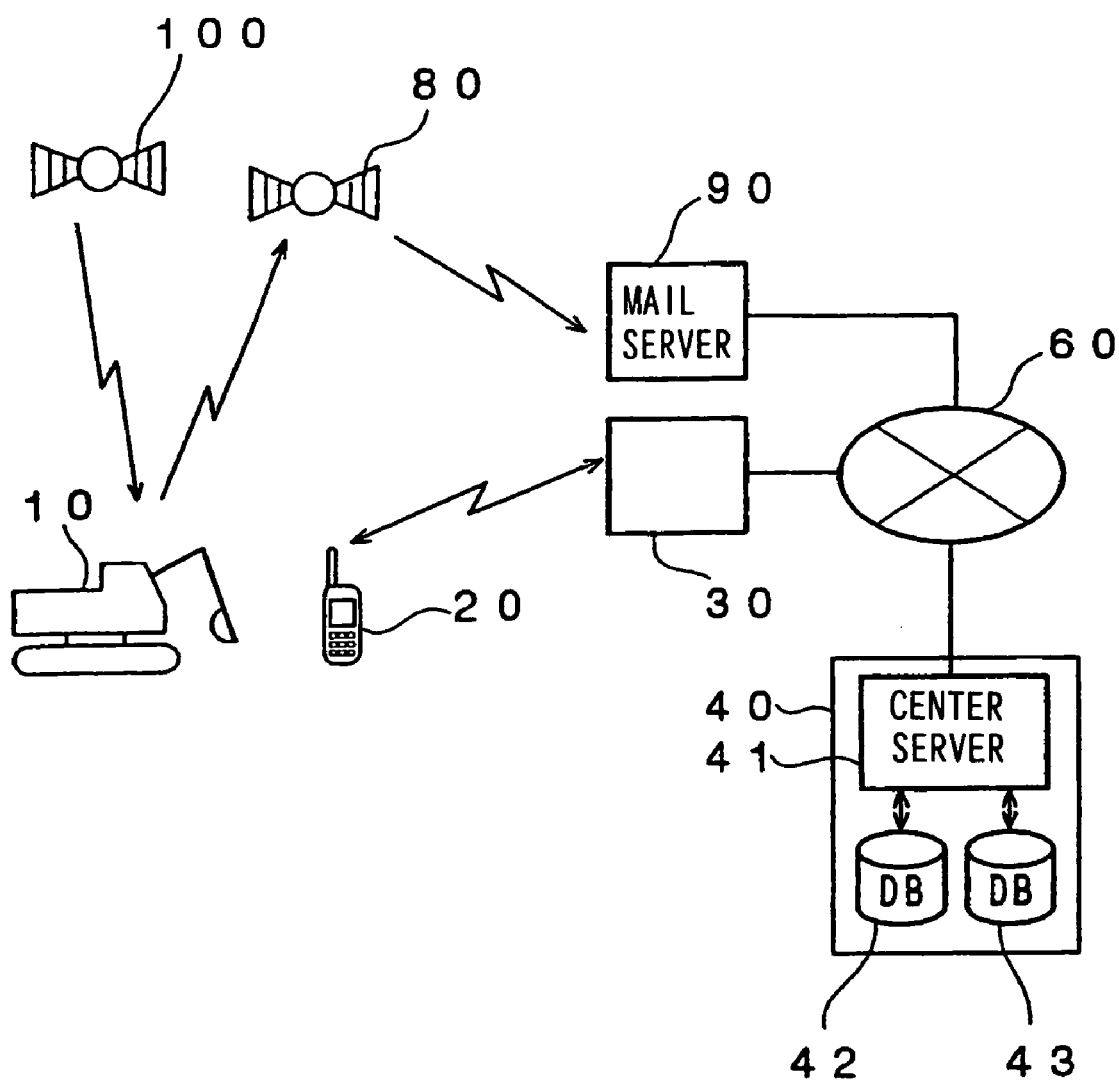
FIG. 1 shows the configuration of the hydraulic excavator assessment system achieved in an embodiment.

FIG. 1 shows the configuration of a system according to the present invention. This system makes it possible to transmit operation information and the like detected at a hydraulic excavator 10 to a construction machine manufacturer (hereafter to be referred to simply as the manufacturer) 40 via a communication satellite 80. In addition, it allows the results of a visual assessment of the hydraulic excavator 10 conducted by a service person to be transmitted to the manufacturer 40 from a portable telephone 20 via an on-line service provider 30. The current position of the hydraulic excavator can be detected with a GPS satellite 100. The following is an explanation of the specific structural features.

Figure 2:
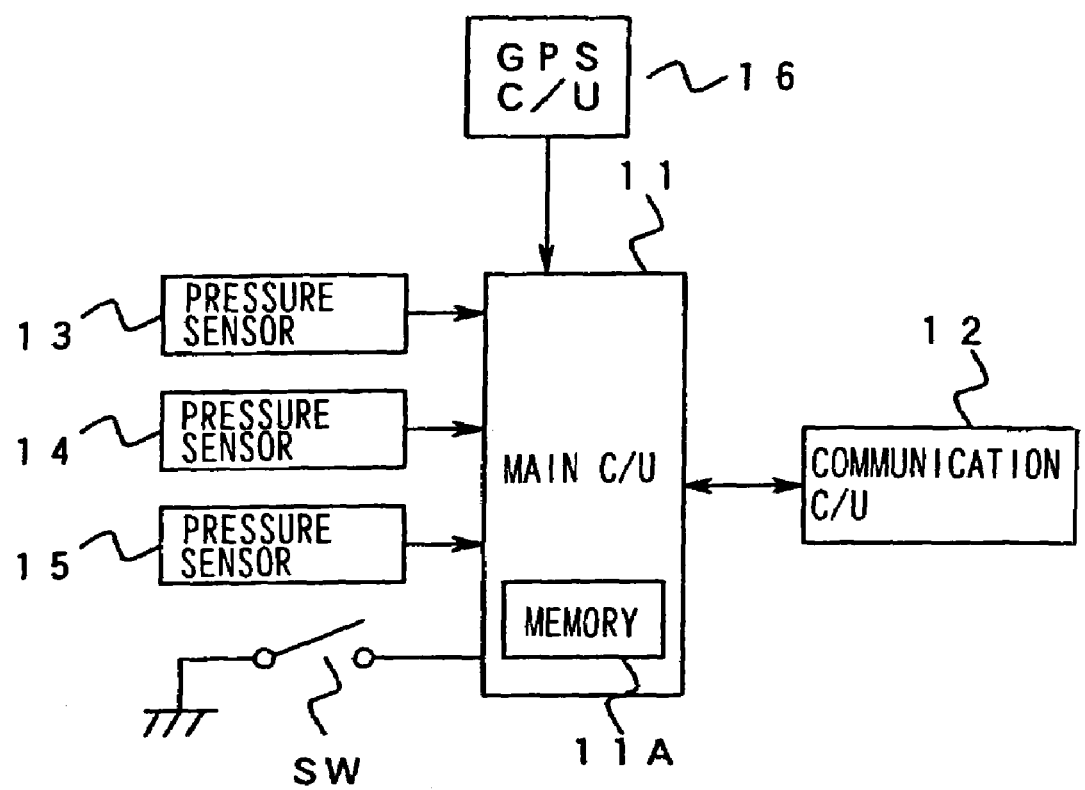
FIG. 2 is a block diagram of the control system of the hydraulics excavator.

Hydraulic excavators 10 each comprise a main control unit 11, a communication control unit 12 and a GPS control unit 16 as shown in FIG. 2. The control unit 11, which is constituted with a CPU, a ROM, a RAM and other components such as an interface, executes programs for hydraulic excavator drive control processing, management processing of various types of data and the like. A switch SW that detects the state of an engine key input thereto and pressure sensors 13, 14 and 15 that respectively detect the excavating load, the swinging load and the traveling load are connected to the control unit 11. The control unit 11 obtains the operation information on the hydraulic excavator 10 based upon the information input from the individual sensors and the switch. The operation information includes, for instance, the length of time over which the engine of the construction machine has been engaged in operation, the length of time over which the construction machine has been engaged in excavation, the length of time over which the construction machine has been engaged in swinging operation and the length of time over which the construction machine has been engaged in traveling operation.

The GPS control unit 16 receives radio waves from a plurality of GPS satellites 100 and calculates position information indicating the position of the corresponding hydraulic excavator 10. The position information obtained through the arithmetic operation at the GPS control unit 16 is then input to the control unit 11. The position information obtained in this example may be geographic coordinate information.

The communication control unit 12, having a CPU, a ROM, a RAM and other components such as an interface, executes a program for the management processing of the various types of data and the like. The communication control unit 12 transmits the operation information and the position information on the hydraulic excavator 10 at a predetermined time point each day. An ID number used as an identifier for identifying the hydraulic excavator is attached to the information transmitted at this time. The transmitted information is sent to a specific management server via the communication satellite 80. In this embodiment, a mail server 90 constitutes the management server. Then, the information having been sent to the mail server 90 is further sent to the manufacturer 40 via a communication network 60.

At the manufacturer 40 which constitute a base station, a center server 41, a history database 42 and an operation database 43 are installed, and the operation information sent from the mail server 90 is stored into the operation database 43 via the center server 41. Mainly, information on the history of past repairs and past part replacements with regard to the hydraulic excavator 10 is stored in the history database 42. The various types of data are stored into the operation database 43 and the history database 42 in correspondence to the IDs of the individual hydraulic excavators.

Figure 3:
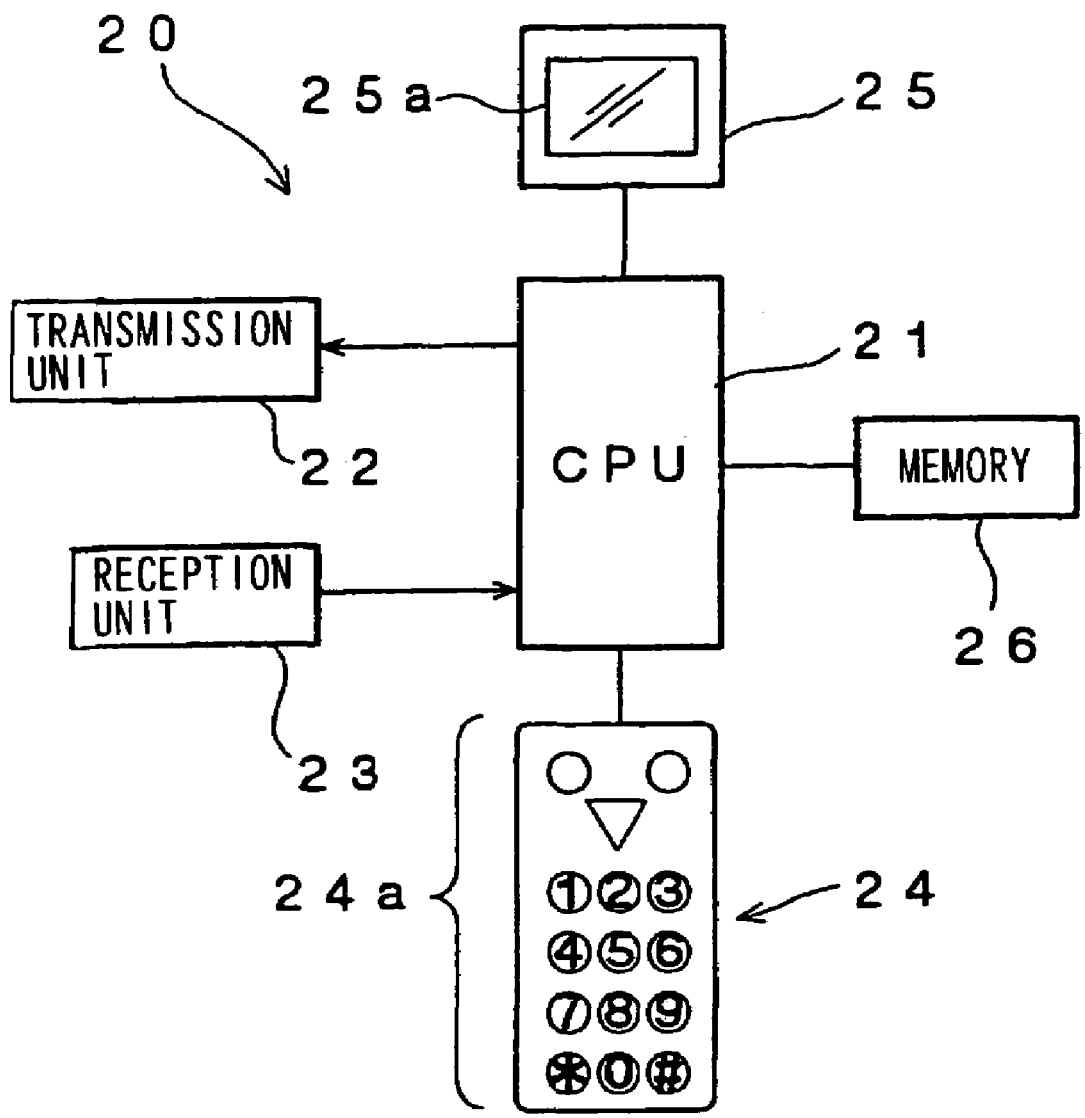
FIG. 3 is a block diagram of the control system of the portable telephone.

In the control block diagram of the portable telephone (portable information transceiver) 20 presented in FIG. 3, a transmission unit 22, a reception unit 23, an operation unit 24, a display unit 25 and a memory 26 are connected to a CPU 21. The transmission unit 22 and the reception unit 23 are information transmission/reception units engaged in operation when making phone calls or in an on-line service mode to be detailed later. A plurality of operation keys 24a such as numeric keys are provided at the operation unit 24, and various types of information including telephone numbers can be entered by using these keys 24a. In addition, commands such as data transmission/reception start commands and individual mode selection commands can be entered via the operation unit 24. A liquid crystal display 25a, for instance, is provided at the display unit 25 and the various types of information can be displayed on the display 25a.

At the portable telephone 20, the on-line service mode as well as the regular telephone mode can be selected in the embodiment. The on-line service mode is selected to use on-line services for portable telephones provided by electric communication business operators and the like, and enables an Internet connection, mail transmission/reception and the like via the on-line service provider 30 (see FIG. 1) and the communication network 60. In the embodiment, data are transmitted to the manufacturer 40 by accessing the center server 41 of the manufacturer 40 and also information transmitted by the manufacturer 40 is received by accessing the center server 41.

It is assumed that each service person dispatched by the manufacturer 40 always carries the portable telephone 20 described above.

Now, a specific example of the used vehicle assessment processing executed in the system configured as described above is explained.

(1) Acquisition and Storage of the Operation Information

Figure 4:
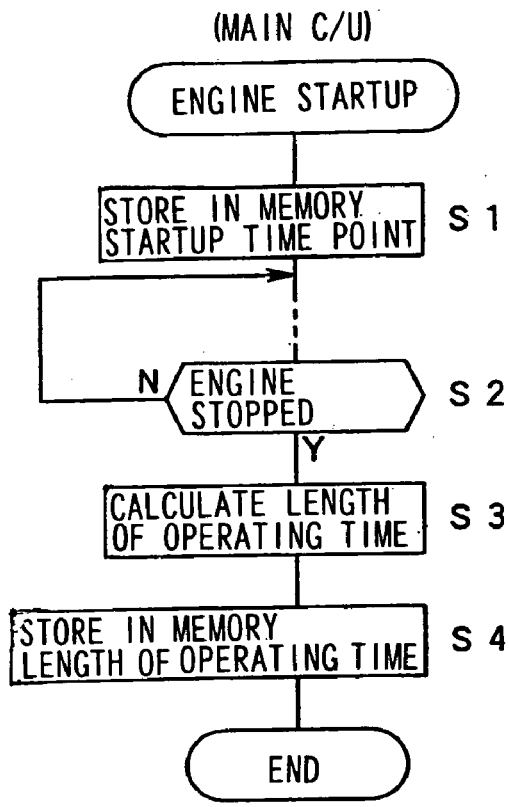
FIG. 4 presents a flowchart of the operating time measurement processing executed at the main control unit of the hydraulic excavator.

FIG. 4 shows the processing executed at the control unit 11 of each hydraulic excavator 10. First, as the engine is started up, the engine startup time point is stored into a memory 11A (step S1). Subsequently, as it is judged in step 2 based upon the state of the switch SW that the engine has stopped, the length of time over which the hydraulic excavator has been engaged in operation is calculated by subtracting the startup time point stored in memory from the engine stop time point (step S3). Then, the calculated length of operating time is added to the operating time length for the day currently stored in memory, and the sum is stored into the memory 11A (step S4). It is to be noted that if the operating time length for the day has not yet been stored into memory, the length of operating time calculated as described above is directly stored into memory. As a result, the length of total operating time for the entire day is ultimately stored into the memory 11A.

While an explanation has been given in reference to FIG. 4 on the measurement of the operating time length, the lengths of time over which the hydraulic excavator has been engaged in excavating operation, traveling operation and swinging operation and the like are individually measured as well. These time lengths can be obtained by implementing timer count control based upon the outputs from the pressure sensors 13–15, and the information thus obtained is stored into the memory 11A.

Figure 5:
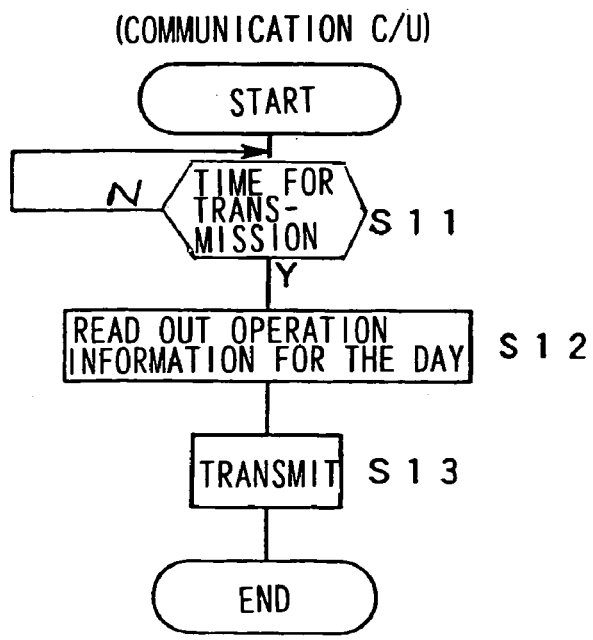
FIG. 5 presents a flowchart of the operation information transmission processing executed at the communication control unit of the hydraulic excavator.

FIG. 5 shows the processing executed at the communication control unit 12 of the hydraulic excavator 10. When it is judged that the predetermined transmission time point has arrived (step S11), the operation information described above is read out from the memory 11A (step S12), and the operation information thus read out is transmitted (step S13). At this time, the position information indicating the position of the hydraulic excavator 10 calculated at the GPS control unit 16 and the ID number used to identify the hydraulic excavator 10 are also transmitted. It is assumed that the transmission is executed daily late at night to transmit the entire information for the previous day.

The information transmitted from each hydraulic excavator 10 is sent to the mail server 90 via the communication satellite 80 and is then transferred to the center server 41 at the manufacturer 40 as explained earlier. At the center server 41, the correct data storage area at the operation database 43 is searched by using the transferred ID number as a key and the operation information is stored into the area. Thus, the operation information on the hydraulic excavators 10 is accumulated and stored in correspondence to the individual hydraulic excavators at the operation database 43. The position information is stored in a similar manner in addition to the operation information.

(2) Transmission of Assessment Information by Service Personnel

Figure 6:
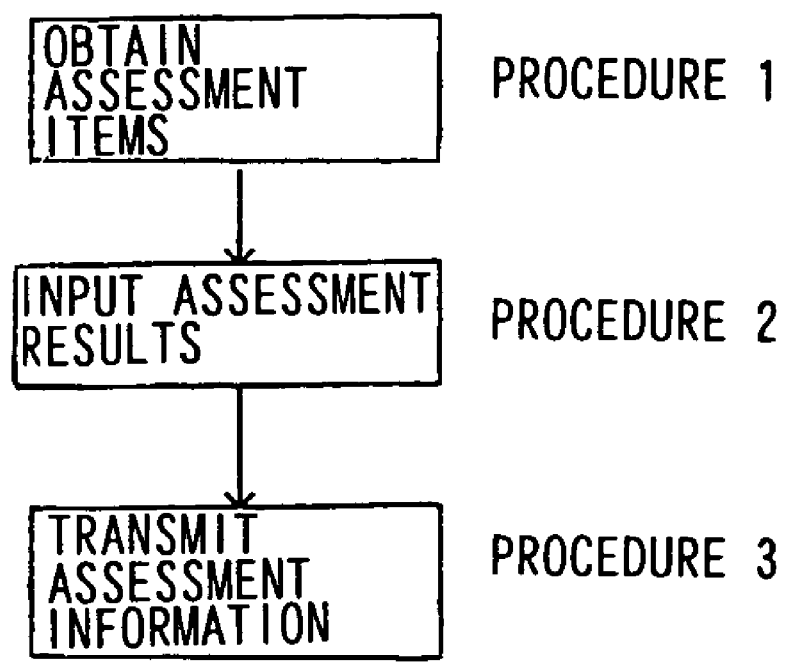
FIG. 6 shows the sequence of the assessment procedures performed by the service person.

A service person transmits the assessment information by following the procedures shown in FIG. 6.

Procedure 1: Acquisition of Assessment Items

In order to assess a hydraulic excavator 10, a service person accesses the center server 41 (a website) of the manufacturer 40 by selecting the on-line service mode for the portable telephone 20. Then, he enters a password as necessary to call up a specific assessment item acquisition screen which is then displayed on the display 25a. By performing a specific operation on this screen, an assessment form (checklist) for the hydraulic excavator 10 is downloaded into the memory 26 of the portable telephone 20. The assessment form thus received, which lists a plurality of assessment items in correspondence to the individual parts of the hydraulic excavator to be assessed, also includes sections where the assessment results are entered in correspondence to the individual assessment items.

The assessment items are mainly details that cannot be detected with the sensors, i.e., details that need to be visually inspected by the service person (except for the length of engine operating time), such as scars, deformation and wear at the various parts, as shown in FIGS. 7(a)–7(d), for instance.

Procedure 2: Entry of the Assessment Results

The service person displays the received assessment form at the display 25a, and conducts an assessment in conformance to the criteria indicated in FIGS. 7(a)–7(d) while checking the assessment items. These criteria are clearly indicated in the assessment form. Then, he sequentially enters the assessment results (the number of points to be deducted) for the individual items by operating the keys 24a provided at the operation unit 24. The information thus entered is displayed in the corresponding assessment results entry sections on the display 25a.

Procedure 3: Transmission of the Assessment Information

Once the assessment of all the items and the entry of the assessment results are completed, a transmission command is input through the operation unit 24 and the assessment results corresponding to the individual items are transmitted as assessment information. At this time, the ID number which enables an identification of the assessed hydraulic excavator 10 is also transmitted.

It is to be noted that after obtaining the assessment form from the center server 41, the assessment operation and the entry operation may be performed in an offline state and then the center server 41 may be accessed again to transmit the assessment information. Alternatively, after obtaining the assessment form, the connection with the center server 41 may be maintained until the transmission of the assessment information is completed. As a further alternative, the assessment information transmission processing may be executed via e-mail.

(3) Calculation of Assessment Value

Figure 8:
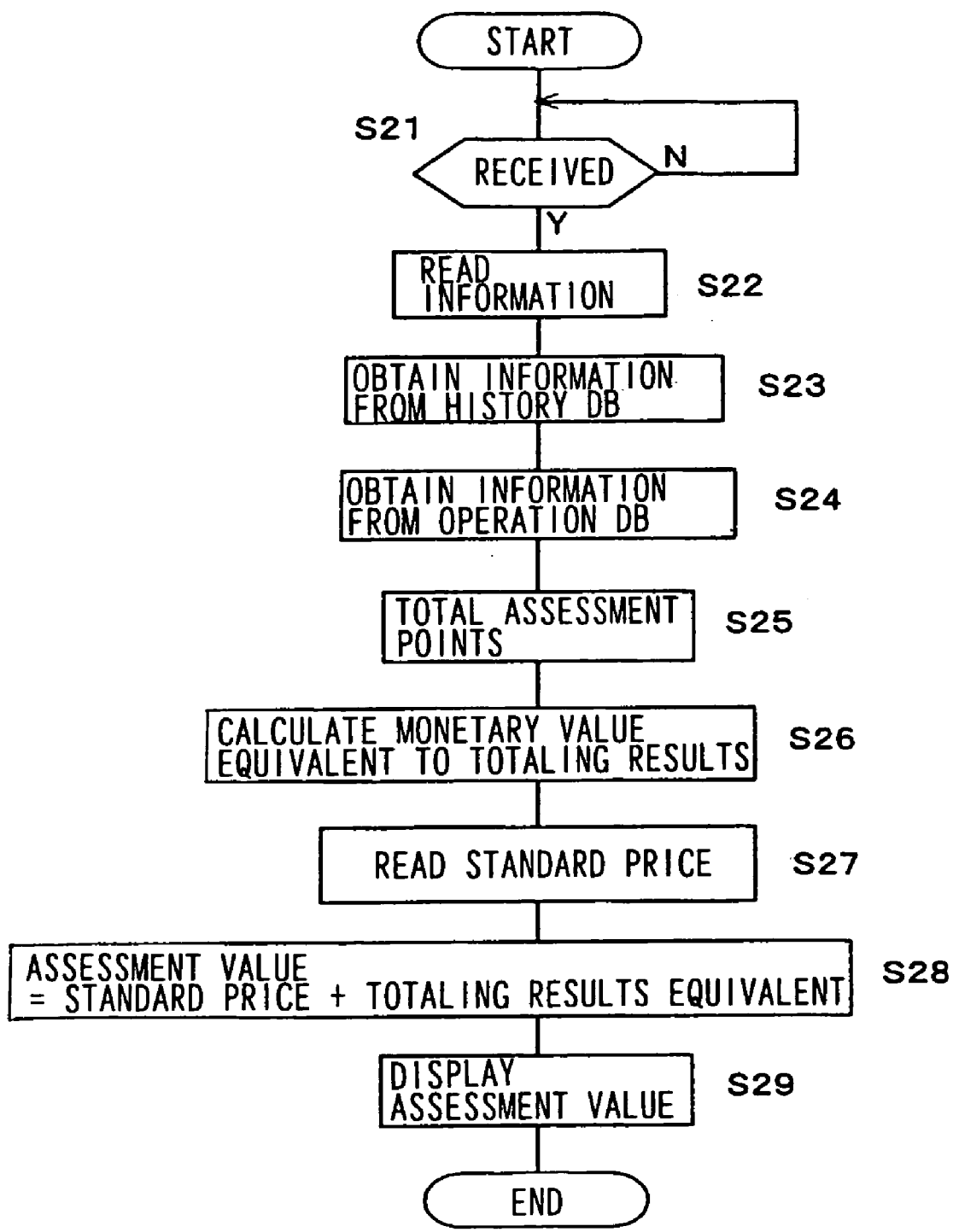
FIG. 8 presents a flowchart of the assessment value calculation processing executed at the center server of the construction machine manufacturer.

At the center server 41 of the manufacturer 40, the processing shown in FIG. 8 is executed to calculate the used vehicle assessment value. This processing is automatically executed by using dedicated software built into the center server 41 upon receiving the assessment information from the service person.

First, a decision is made as to whether or not assessment information has been received from a service person (step S21), and if it is judged that assessment information has been received, the received information (the assessment information and the ID number) is read (step S22).

In addition, the history database 42 is searched by using the received ID number as a key and the history information corresponding to the hydraulic excavator 10 is read (step S23). The history information includes information indicating whether or not any optional parts such as an attachment have been purchased in addition to information indicating, for instance, the history of past repairs, part replacements, oil changes, regular inspections, accidents and overhauls. Based upon this information, the numbers of points to be deducted or added are determined. For instance, as shown in FIG. 9(a), additional points are awarded if the hydraulic excavator 10 is equipped with an optional part.

In addition, the operation information database 43 is searched in a similar manner and the operation information corresponding to the hydraulic excavator 10 is read (step S24). As explained earlier, the operation information indicate the length of operating time, the lengths of time over which the hydraulic excavator 10 has been engaged in excavating operation, traveling operation, swinging operation and the like. For instance, the number of points to be deducted is determined in conformance to the length of time over which the hydraulic excavator 10 has been engaged in operation, as shown in FIG. 7(a). A specific number of points is deducted in conformance to the year in which the hydraulic excavator 10 was manufactured (see FIG. 9(b)), as well.

Through the processing executed up to this point, the numbers of points to be deducted (the numbers of points to be added on) with respect to all the items that need to be assessed are ascertained. In step S25, these points are totaled and then in step S26, the total points are used for substitution in a specific computing equation to convert the number of points to a monetary value (a value equivalent to the totaling results). In addition, the standard price of the hydraulic excavator 10 is read from a specific database (step S27) and the monetary value obtained by adding the totaling results equivalent value described above to the standard price is calculated as the assessment value (step S28). The assessment value thus calculated is displayed at the monitor at the center server 41 together with the points calculated for the individual items based upon which the assessment was made (step S29). The information on display can be printed out as necessary.

The calculation of the used vehicle assessment value executed in the embodiment as described above is summarized below.

The results of the assessment on the hydraulic excavator 10 conducted by the service person (the results of a visual assessment) are transmitted to the server 41 of the manufacturer 40 from the portable telephone 20. At the server 41, the used vehicle assessment value for the hydraulic excavator 10 is automatically calculated based upon the received assessment information, and the history information and the operation information on the hydraulic excavator 10 read out from the databases 42 and 43. This achieves a great improvement in the efficiency of the assessment process compared to the manual assessment value calculation in the related art and, at the same time, the onus placed on the service personnel is reduced.

It is to be noted that the assessment value calculation processing shown in FIG. 8 only represents an example, and the assessment value may be determined through procedures different from those shown in FIG. 8. In addition, while a portable telephone is distinguished from a PHS telephone under normal circumstances, the term "portable telephone" as used in this description represents a concept that includes PHS telephones. In other words, the data exchange described above may be achieved by using PHS services. Furthermore, a mobile personal computer may be utilized in place of a portable telephone.

Second Embodiment

Figure 10:
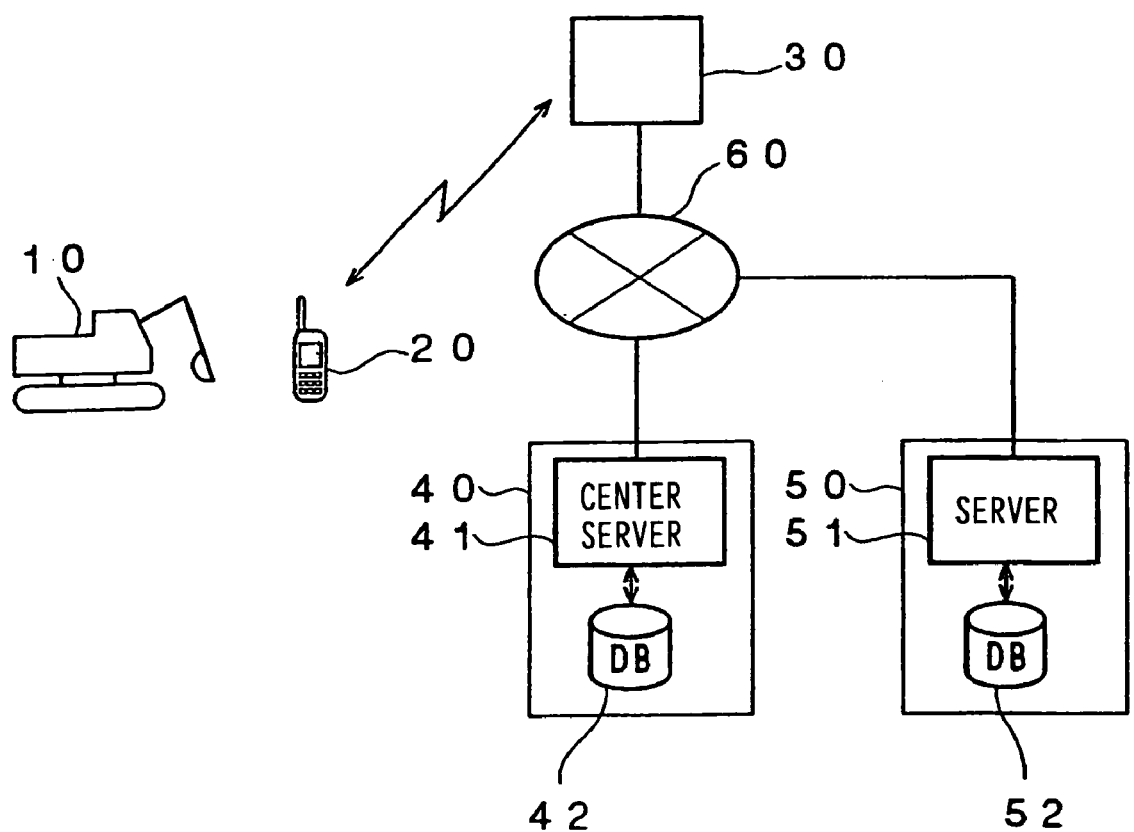
FIG. 10 schematically shows the configuration of the construction machine inspection information transmission/reception system achieved in an embodiment.
Figure 11:
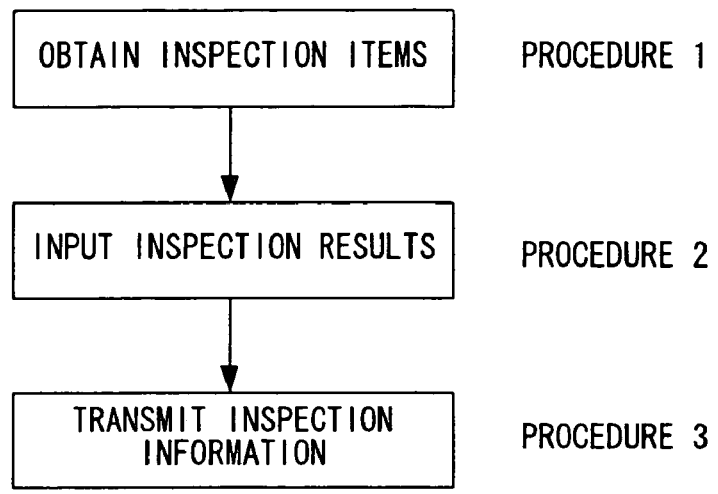
FIG. 11 shows the sequence of the procedures followed to inspect a hydraulic excavator, input the results of the inspection and transmit the inspection results.
Figure 12:
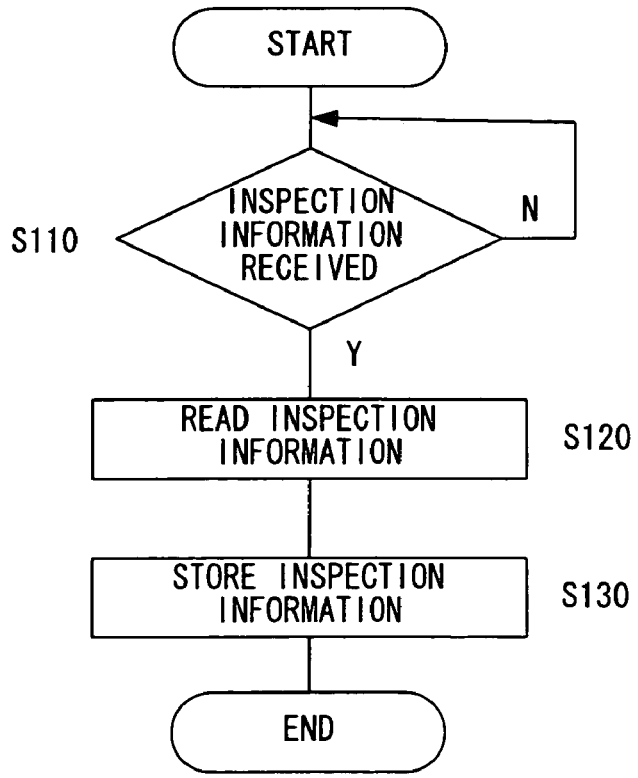
FIG. 12 presents a flowchart of an example of the inspection information reception/storage processing executed at the center server of the construction machine manufacturer.

The second embodiment in which the present invention is adopted in a hydraulic excavator information transmission/ reception system is explained in reference to FIGS. 10–12. The same reference numerals are assigned to members identical to those in the system block diagram presented in FIG. 1 and the following explanation focuses on the difference from the system shown in FIG. 1.

FIG. 10 is a schematic diagram showing the system configuration adopted in the embodiment. In the embodiment, the results of an inspection conducted on a hydraulic excavator 10 can be transmitted from the portable telephone 20 to the construction machine manufacturer (hereafter simply referred to as the manufacturer) 40 and a construction machine rental company 50 via an on-line service provider 30. At the manufacturer 40 and the rental company 50, servers 41, 51 and databases 42, 52 for storing inspection information and the like are respectively installed. Hereafter, the server 41 at the manufacturer 40 is to be referred to as a center server.

FIG. 11 shows the sequence of inspection information transmission processing executed through the system described above.

Procedure 1: Acquisition of Inspection Items

In order to conduct an inspection of a hydraulic excavator 10, a service person dispatched from the manufacturer 40 or the rental company 50 accesses the center server 41 (a website) of the manufacturer 40 by selecting the on-line service mode for the portable telephone 20. Then, he enters a password as necessary to call up a specific inspection item acquisition screen which is then displayed on the display 25a. By performing a specific operation on this screen, an inspection form (checklist) for the hydraulic excavator 10 is received at the portable telephone 20 and then downloaded into the memory 26. The inspection form, which lists a plurality of inspection items in correspondence to the individual parts of the hydraulic excavator to be inspected, also includes sections where the inspection results are entered in correspondence to the individual inspection items. The inspection items are mainly details that cannot be detected with the sensors (details that need to be visually inspected by the service person) such as scars, damage to parts.

Procedure 2: Entry of the Inspection Results

The service person displays the received inspection form at the display 25a, and conducts an inspection while checking the inspection items. Then, he sequentially enters the inspection results for the individual items. The results are entered by operating the keys 24a provided at the operation unit 24. The information thus entered is displayed in the corresponding inspection results entry sections on the display 25a.

Procedure 3: Transmission of the Inspection Information

Once the inspection of all the items and the entry of the inspection results are completed, a transmission command is input through the operation unit 24 and the inspection results corresponding to the individual items are transmitted as inspection information. At this time, the ID number which enables an identification of the inspected hydraulic excavator 10 is also transmitted.

It is to be noted that after obtaining the inspection form from the center server 41, the inspection operation and the entry operation may be performed in an offline state and then the center server 41 may be accessed again to transmit the inspection information. Alternatively, after obtaining the inspection form, the connection with the center server 41 may be maintained until the transmission of the inspection information is completed. As a further alternative, the inspection information transmission processing may be executed via e-mail.

The processing shown in FIG. 12 is executed at the center server 41 of the manufacturer 40. A decision is made as to whether or not any inspection information from a service person has been received (step S110), and if it is decided that inspection information has been received, the received information (the inspection information and the ID number) is taken in (step S120). Then, the information thus taken in is stored into the database 42 in correspondence to the ID number (step S130).

In the system achieved in the second embodiment, the database 42 at the manufacturer 40 may be a shared database from which inspection information related to machines owned by the rental company 50 is extracted by the rental company 50 whenever necessary to store into its own database 52. In such a case, a rental ID number that will allow specific construction machines to be identified as hydraulic excavators owned by the rental company 50 may be stored in the database 42 in correspondence to the hydraulic excavator ID numbers. The center server 41 may assume a structure that allows various types of data to be transmitted to the server 51 of the rental company 50 in response to a data acquisition request issued by the rental company 50 when the rental company 50 enters a hydraulic excavator ID number together with the rental ID number.

Alternatively, if inspection information is transmitted by a service person dispatched by the rental company 50 by using a portable telephone with built-in software similar to that in the portable telephone 20 described earlier, the inspection information may also be transmitted to the rental company 50 for which the service person works at the same time as well as to the manufacturer 40. In such a case, the service person should enter the rental ID number to indicate that the hydraulic excavator is owned by the rental company 50. At the server 51 of the rental company 50, the various types of data on the hydraulic excavator are recorded in correspondence to the rental ID number.

It is to be noted that while both the rental ID number and the hydraulic excavator ID number are entered in the explanation given above, the two types ID numbers are stored in correspondence to each other at the database 42. Accordingly, the rental ID number assigned to the rental company 50 alone may be entered when the rental company 50 issues a data acquisition request to have the data concerning all the hydraulic excavators corresponding to the rental ID number transmitted to the server 51 of the rental company 50. In addition, service persons may transmit inspection information simply by entering the hydraulic excavator ID numbers alone.

The results of an inspection conducted on a hydraulic excavator 10 can be transmitted to the manufacturer 40 speedily by following the procedures described above, and thus, the need to perform the time-consuming tasks of first entering the results in the inspection form on a hard copy basis and then entering the details through a terminal as in the related art is eliminated to achieve an improvement in the efficiency of the inspection processing. In addition, since the inspection information is stored into the database at the manufacturer 40 regardless of whether the inspection has been conducted by a service person dispatched by the manufacturer 40 or the rental company 50, the problem of inspection information resulting from an inspection conducted by a service person dispatched by the rental company 50 not being readily available to the manufacturer 40 is eliminated.

Third Embodiment

The third embodiment in which the present invention is adopted in a hydraulic excavator data input/output system is explained in reference to FIGS. 13–16.

The system achieved in this embodiment allows data stored in a hydraulic excavator 10 to be read out by using a portable telephone 20 and data recorded at the hydraulic excavator 10 to be overwritten by using the portable telephone 20. In addition, by selecting the on-line service mode explained in reference to the first embodiment, information can be exchanged between the portable telephone 20 and the center server 41 (see FIG. 1) at the construction machine manufacturer 40 (see FIG. 1). The following is an explanation of the specific structural features adopted in the embodiment.

Figure 13:
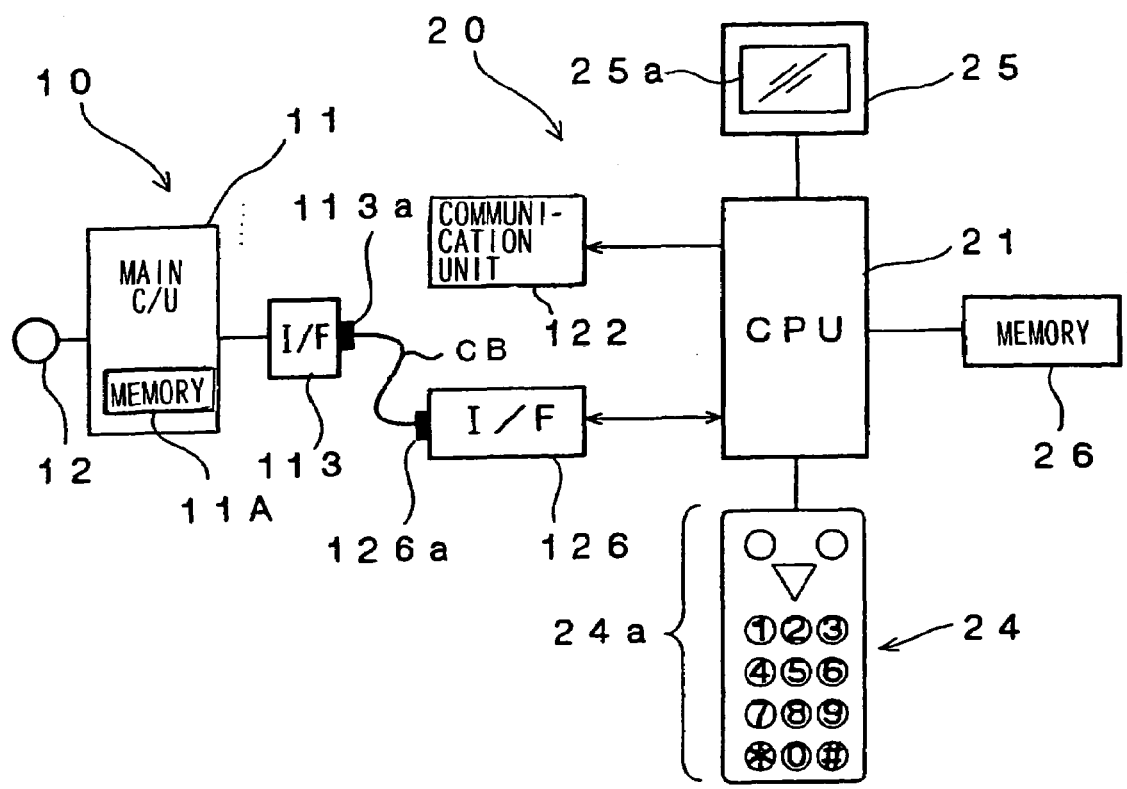
FIG. 13 is a block diagram of the control systems of the hydraulic excavator and the portable telephone.

FIG. 13 is a block diagram of the control systems of the hydraulic excavator and the portable telephone. In the explanation, the same reference numerals are assigned to components identical to those shown in FIGS. 2 and 3.

A group of sensors 12 is connected to the control unit 11 mounted at the hydraulic excavator 10. The sensor group 12 includes, for instance, pressure sensors that detect the pump pressure and the pilot pressure and temperature sensors that detect the engine cooling water temperature and the hydraulic operating fluid temperature. The control unit 11 measures the lengths of time over which the hydraulic excavator 10 has been engaged in excavating operation, traveling operation and swinging operation, the length of time over which the engine has been engaged in operation and the like by controlling timers (not shown) based upon the detection outputs from the individual sensors, and also detects the presence/absence of any abnormality at various parts. The detection data are stored into the memory 11A within the control unit 11. In addition, a connection port 113a used to achieve a cable connection with the portable telephone 20 is provided at an external input/output interface 113 connected to the control unit 11.

The portable telephone 20 is basically identical to that illustrated in FIG. 3. It includes a CPU 21 to which a communication unit 122, a memory 26, an operation unit 24 and a display unit 25 are connected. While operation keys 24a, which may be numeric keys, provided at the operation unit 24 are used to enter telephone numbers under normal circumstances, they are used to overwrite the data at the hydraulic excavator 10 in a data input/output mode detailed later. While a liquid crystal display 25a provided at the display unit 25 is normally used to display dates, telephone numbers and the like, it is used to display data provided by the hydraulic excavator 10 or data provided by the manufacturer 40 in the data input/output mode. In addition, a connection port 126a used to achieve a cable connection with the hydraulic excavator 10 is provided at an external input/output interface 126 connected to the CPU 21.

One of the following three modes can be selected at the portable telephone 20 in the embodiment.

(1) Normal telephone (communication) mode (2) On-line service mode (3) Data input/output mode The telephone mode is selected to communicate with the manufacturer 40 and other business contacts. The on-line service mode is selected to use portable telephone on-line services provided by an electric communication business operator or the like and enables an Internet connection, electronic mail transmission/reception and the like via an on-line service provider and a general communication line. In the embodiment, data are transmitted to the base station, i.e., the manufacturer 40, by accessing the website operated by the manufacturer 40 and information provided by the manufacturer is received by accessing the website. The data input mode which is selected to exchange data with the hydraulic excavator 10 is to be explained in detail later. These modes are selected by operating the operation unit 24.

Figure 14:
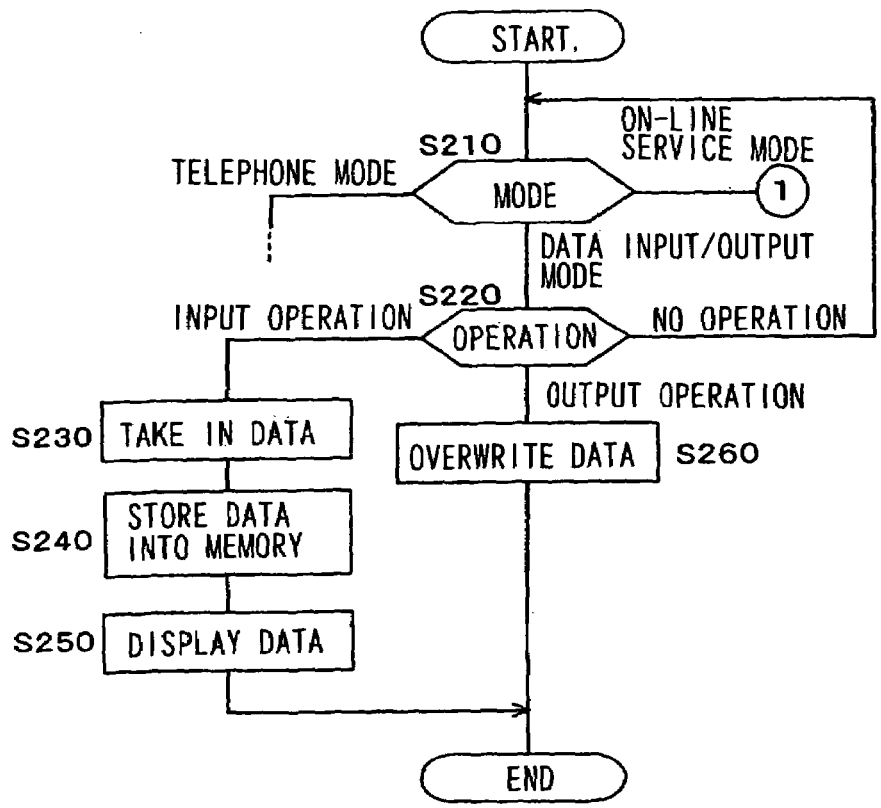
FIG. 14 presents a flowchart of an example of the processing procedures executed in conformance to the program in the portable telephone.
Figure 15:
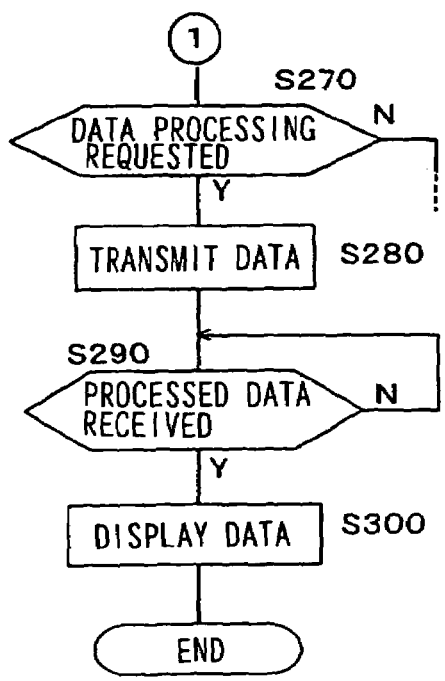
FIG. 15 presents a flowchart continuous from that presented in FIG. 14.

Now, in reference to the flowchart presented in FIGS. 14 and 15, a specific example of the data transmission/reception processing is explained. It is to be noted that this processing is realized by building dedicated software into the portable telephone 20.

FIGS. 14 and 15 show the sequence of control implemented by the CPU 21 of the portable telephone 20. It is assumed that the connection port 126a of the portable telephone 20 and the connection port 113a of the hydraulic excavator 10 are connected with each other through a cable CB and that the various types of data explained earlier are already stored in the memory 11A of the hydraulic excavator 10.

In the sequence shown in FIG. 14, a decision is first made as to which of the three modes explained above is currently set (step S210). If it is decided that the telephone mode is currently set, normal telephone processing is executed (a detailed explanation is omitted). If it is decided that the data input/output mode is currently set, the processing enters a standby state to wait for an operation at the operation unit 24. If a data input operation is performed, the data (the lengths of time over which the hydraulic excavator has been engaged in excavating operation, traveling operation and swinging operation, the length of time over which the engine has been engaged in operation and the like) stored in the memory 11A of the hydraulic excavator 10 are taken into the portable telephone 20 via the cable CB (step S230). The data thus taken in are stored into a memory 23 (step S240). The stored data are then converted into a format that will allow the data to be displayed and the converted data are displayed at the liquid crystal display 25a at the display unit 25 (step S250).

If, on the other hand, a data output operation is performed in the data input/output mode, a signal corresponding to the operation is transmitted to the control unit 11 of the hydraulic excavator 10 and, in response, the control unit 11 overwrites the data in the memory 11A in correspondence to the operation (step S260).

In more specific terms, the data are overwritten through the following procedure.

In the control unit 11, mounted at the hydraulic excavator 10 as shown in FIG. 13, a control program for implementing locus control for the front unit of the hydraulic excavator, interference prevention control for preventing interference between the front unit and the operator's cab and the like, for instance, is stored. When executing such control, data related to the shapes of the boom, the arm, the bucket and the like must be used in the arithmetic operation. Accordingly, the data related to such shapes are stored in the control unit 11. There are situations in which the nature of the work that the hydraulic excavator 10 has to undertake necessitates the arm to be replaced with a longer arm or the bucket to be replaced with a wider bucket. When a part is replaced under such circumstances, the data on the shape of the corresponding front member stored in the control unit 11 must be overwritten. When it is decided in step S220 in FIG. 14 that the output mode has been selected, the data to be overwritten are specifically read out from the control unit 11. The data thus read out are displayed at the display unit 25 so as to enable an overwrite on the screen via the operation unit 24 and then the updated data are stored back into the main control unit 11 (step S260).

As described above, the data stored in the memory 11A of the hydraulic excavator 10 can be taken into the portable telephone 20 and displayed at the portable telephone 20 in this embodiment. In addition, the operation unit 24 at the portable telephone 20 can be used as a keyboard to overwrite the data in the memory 11A of the hydraulic excavator 10. A plurality of numeric keys 24a normally used in the telephone mode are provided at the operation unit 24, and numeric data can be modified easily by using these keys 24a. It is to be noted that during a data overwrite the original data and the new data contents resulting from the overwrite are sequentially displayed at the display unit 25 of the portable telephone 20

Since the data taken into the memory 26 of the portable telephone 20 are unprocessed raw data, their contents are not always visually intelligible. Accordingly, in order to display the data as more visually comprehensible information, the data should first be sent to an appropriate department where they can be processed and then the processed data should be sent back. The department that processes the data may be, for instance, the manufacturer 40.

In order to transmit the data to the manufacturer 40, the on-line service mode should be selected at the portable telephone 20. In this case, the processing proceeds from step S210 to step S270 in FIG. 15, and as a data processing request operation is executed, the data in the memory 23 are transmitted from a communication unit 122 in step S20. The transmitted data are sent to the center server 41 at the manufacturer 40 via the on-line service provider 30 and the communication network 60.

Upon receiving the data from the portable telephone 20, specific data processing is executed on the data at the center server 41 of the manufacturer 40, and then the processed data are transmitted. The transmitted data a resent to the portable telephone 20 via the on-line service provider 30 and the communication network 60.

Figure 16:
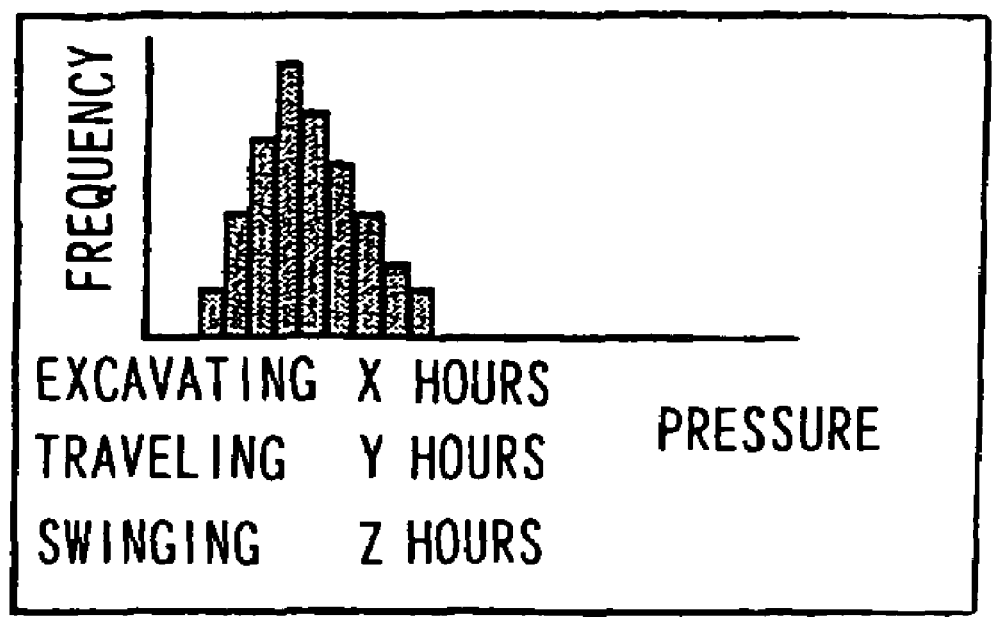
FIG. 16 presents a display example of data transmitted from the manufacturer.

Upon receiving the data (the processed data) from the center server 41 (step S290), the data are displayed at the liquid crystal screen 25a of the portable telephone 20 (step S300). In this display, the data are presented as a graph, for instance, as shown in FIG. 16 or they may be presented in a table, i.e., in a more comprehensible format than the raw data.

It is to be noted that instead of simply presenting the data in a more visually comprehensible format, the data may be analyzed at the center server 41 and the results of the analysis may be provided to the portable telephone 20 for display. The data processing as referred to in the claims represents a concept that includes such an analysis. In addition, when data are transmitted from the portable telephone 20 to the manufacturer 40, a specific processing method may be indicated by the portable telephone side, so that the manufacturer 40 (the center sever 41) processes the data through the specified processing method and sends back the processed data. Alternatively, instead of having the data processed at the manufacturer 40, software, which enables data processing, may be built into the portable telephone 20. Furthermore, software having a function of simply transmitting data to the manufacturer may be built into the portable telephone 20. In the latter case, whenever the manufacturer 40 needs the data on a specific hydraulic excavator 10, for instance, the manufacturer 40 can have the data transmitted by contacting the personnel on the work site to obtain the data on the desired hydraulic excavator 10 promptly.

The data exchange between the portable telephone 20 and the control unit 11 may be achieved through a wireless communication such as an infrared communication.

INDUSTRIAL APPLICABILITY

The present invention may be adopted in an assessment method (system) or an inspection information transmission/reception method (system) in conjunction with construction machines (e.g., cranes) other than hydraulic excavators. While various types of data on a hydraulic excavator are taken in by using a portable telephone, the present invention may also be adopted when taking in various types of data on another type of construction machine such as a crane.

The invention claimed is:

1. A construction machine inspection information transmission/reception method, wherein:

a program is installed in a portable telephone, which is capable of a telephone call, for receiving specific inspection items transmitted from a base station at the portable telephone, displaying the specific inspection items at a display unit of the portable telephone, displaying information of inspection results with regard to the specific inspection items having been entered into the portable telephone at the display unit of the portable telephone, and transmitting the information of the inspection results having been entered from the portable telephone;

the specific inspection items are transmitted from the base station to the portable telephone;

the specific inspection items transmitted from the base station are received at the portable telephone by executing the program in the portable telephone;

the specific inspection items are displayed at the display unit of the portable telephone by executing the program in the portable telephone, the specific inspection items identifying features of the construction machine to be inspected, and prompting an inspector to enter an inspection result into the portable telephone for each specific inspection item;

the information of the inspection results with regard to the specific inspection items having been entered into the portable telephone are displayed at the display unit of the portable telephone by executing the program in the portable telephone;

the information of the inspection results having been entered is transmitted with an identifier identifying the construction machine from the portable telephone by executing the program in the portable telephone;

the transmitted information of the inspection results and the identifier of the construction machine is received at a base station at a remote location;

the received information of the inspection results is recorded into a database as inspection information corresponding to the identifier of the construction machine;

a sensor is provided in the construction machine;

operation information is obtained based upon information output from the sensor provided in the construction machine;

the obtained operation information is transmitted to the base station; and the specific inspection items are items that can not be detected by the sensor and are transmitted from the base station to the portable telephone in response to an access from the portable telephone to the base station.

2. A construction machine inspection information transmission/reception system, comprising:

a base station provided at a remote location to a construction machine; and a portable telephone capable of a telephone call which exchanges information between the base station and the portable telephone by executing a program installed in the portable telephone, wherein:

the base station includes an inspection item transmission device that transmits inspection items, each inspection item identifying a feature of the construction machine that is to be inspected, to the portable telephone upon judging that an inspection item transmission request has been issued from the portable telephone;

the portable telephone includes a display unit that displays the inspection items transmitted from the inspection item transmission device to prompt an inspector to enter an inspection result for each displayed inspection item, an input unit that is used to enter an inspection result for each inspection item with regard to the construction machine, and a transmission unit that transmits the information of the inspection results with an identifier identifying the construction machine;

the base station includes a reception device that receives the information of the inspection results and the identifier of the construction machine transmitted from the transmission unit and a storage device that stores the information of the inspection results received at the reception device into a database in correspondence to the identifier of the construction machine;

the construction machine comprises a sensor, a main control unit that obtains operation information based on information output from the sensor, and a communication control unit that transmits the operation information obtained by the main control unit to the base station; and the specific inspection items are items that can not be detected by the sensor.

3. A used construction machine assessment method, comprising:

calculating, by a control device of a used construction machine, operation information of the used construction machine based upon information output from a sensor provided in the used construction machine, the operation information including information indicating a length of operating time of the used construction machine;

transmitting, by the control device of the used construction machine, the calculated operation information to a server at a base station with an identifier identifying the used construction machine;

receiving, by the server at the base station, the transmitted operation information and the identifier of the used construction machine, and storing the received operation information into a database in correspondence to the identifier of the used construction machine;

storing further, by the server at the base station, history information including information indicating history of past repairs, part replacements, oil changes, regular inspections, accidents or overhauls of the used construction machine, into the database in correspondence to the identifier of the used construction machine;

transmitting, by the server at the base station, an assessment item related to assessment information that can not be detected by the sensor provided in the used construction machine to a portable telephone, upon judging that a used vehicle assessment form transmission request has been issued from the portable telephone;

receiving, by the portable telephone, the transmitted assessment item and displaying the received assessment item on a display screen so that the assessment information can be input;

transmitting, by the portable telephone, the assessment information having been input with the identifier of the used construction machine to the server at the base station;

receiving, by the server at the base station, the assessment information and the identifier of the used construction machine transmitted by the portable telephone;

calculating, by the server at the base station, a used vehicle monetary value with regard to the used construction machine based upon the received assessment information, and the history information and the operation information read out from the database by using the received identifier of the used construction machine as a key.

4. A used construction machine assessment system comprising:
   a control device provided in a used construction machine;
   a portable telephone;
   a server; and
   a database, wherein:
   the control device provided in the used construction machine calculates operation information of the used construction machine based upon information output from a sensor provided in the used construction machine, and transmits the calculated operation information to the server with an identifier identifying the used construction machine, the operation information including information indicating a length of operating time of the used construction machine;
   the server receives the transmitted operation information and identifier of the used construction machine, stores the received operation information into the database in correspondence to the identifier of the used construction machine, and transmits an assessment item related to assessment information that can not be detected by the sensor provided in the used construction machine to a portable telephone upon judging that a used vehicle assessment form transmission request has been issued from the portable telephone;
   the server further stores history information including information indicating history of past repairs, part replacements, oil changes, regular inspections, accidents or overhauls of the used construction machine, into the database in correspondence to the identifier of the used construction machine;
   the portable telephone receives the transmitted assessment item, displays the received assessment item on a display screen so that the assessment information can be input, and transmits the assessment information having been input with the identifier of the used construction machine to the server;
   the server receives the assessment information and the identifier of the used construction machine transmitted by the portable telephone, and calculates a used vehicle monetary value with regard to the used construction machine based upon the received assessment information, and history information and the operation information read out from the database by using the received identifier of the used construction machine as a key.

5. A used construction machine assessment system according to claim 4, wherein:
   the arithmetic unit starts calculating the used vehicle monetary value in response to receiving the information from the portable telephone.

\* \* \* \* \*